United States Patent [19]

Chung

[11] Patent Number: 4,803,003
[45] Date of Patent: Feb. 7, 1989

[54] ETHYLENE COPOLYMER VISCOSITY INDEX IMPROVER DISPERSANT ADDITIVE USEFUL IN OIL COMPOSITIONS

[75] Inventor: David Y. Chung, Edison, N.J.

[73] Assignee: Exxon Chemical Patents Inc., Linden, N.J.

[21] Appl. No.: 63,144

[22] Filed: Jun. 16, 1987

[51] Int. Cl.$^4$ .................................. C10M 105/22
[52] U.S. Cl. ........................... 252/51.5 A; 252/56 R
[58] Field of Search .................. 252/51.5 A, 33, 47.5, 252/56 R; 525/301, 385, 386, 374

[56] References Cited

U.S. PATENT DOCUMENTS

| | | | |
|---|---|---|---|
| 4,051,049 | 9/1977 | Elliott | 252/51.5 A |
| 4,089,794 | 5/1978 | Engel | 252/51.5 A |
| 4,129,432 | 8/1980 | Girgenti et al. | 252/51.5 |
| 4,137,185 | 1/1979 | Gardiner | 252/51.5 A X |
| 4,144,181 | 3/1979 | Elliott | 252/33 |
| 4,372,863 | 2/1983 | Elliott | 252/51.5 A |
| 4,375,973 | 3/1983 | Rossi | 252/51.5 A X |
| 4,517,104 | 5/1985 | Bloch | 252/51.5 A |
| 4,632,769 | 12/1986 | Gutierrez | 252/51.5 A X |
| 4,637,886 | 1/1987 | Brois | 252/51.5 A |
| 4,670,173 | 6/1987 | Hayashi et al. | 252/51.5 A |
| 4,686,054 | 8/1987 | Wisotsky et al. | 252/32.7 |

FOREIGN PATENT DOCUMENTS 0072645 1/1987 European Pat. Off. .

Primary Examiner—William R. Dixon, Jr.
Assistant Examiner—James M. Hunter, Jr
Attorney, Agent, or Firm—M. B. Kapustij

[57] ABSTRACT

Oil-soluble, derivatized ethylene copolymers derived from about 15 to 90 wt. % ethylene, and one or more $C_3$ to $C_{28}$ alpha-olefins, e.g. propylene, which are grafted, preferably solution-grafted under an inert atmosphere and at elevated temperatures and in the presence of a high-temperature decomposable free-radical initiator, with an ethylenically-unsaturated dicarboxylic acid material and thereafter reacted with a polyamine having at least two primary amine groups, and a carboxylic acid to form carboxyl-grafted polymeric imide, usually maleimide, derivatives are subsequently reacted with a $C_{12}$ to $C_{18}$ hydrocarbyl substituted dicarboxylic acid anhydride, preferably a $C_{12}$ to $C_{18}$ hydrocarbyl substituted succinic anhydride, to yield an oil-soluble stable imide of said carboxyl-grafted copolymeric imide whereby oil solutions thereof are characterized by minimal viscosity change over an extended period of time.

18 Claims, No Drawings

ETHYLENE COPOLYMER VISCOSITY INDEX IMPROVER DISPERSANT ADDITIVE USEFUL IN OIL COMPOSITIONS

BACKGROUND OF THE INVENTION

1. Field of the Invention

The invention relates to polymeric viscosity index (V.I.) improvers-dispersant additives for petroleum oils, particularly lubricating oils whereby oil solutions, particularly oil concentrates, of said additives are characterized by minimal viscosity change over an extended period of time. These additives comprise a copolymer of ethylene with one or more $C_3$ to $C_{28}$ alpha-olefins, preferably propylene, which have been grafted with acid moieties, e.g. maleic anhydride, preferably using a free radical initiator in a solvent such as a lubricating oil, and then reacted with a carboxylic acid component and a polyamine having two or more primary amine groups, or preformed salts, amides, imides, etc. formed by the reaction of said carboxylic acid component with said polyamine, and subsequently treated or reacted with a viscosity stabilizing effective amount of at least one $C_{12}$ to about $C_{18}$ hydrocarbyl substituted dicarboxylic acid anhydride, preferably $C_{12}$ to $C_{18}$ hydrocarbyl substituted succinic anhydride. The invention also relates to process for preparing the preceding products and their use in oil compositions.

2. Description of the Prior Art

U.S. Pat. No. 4,517,104, incorporated herein by reference, discloses polymeric viscosity index (V.I.) improver-dispersant additives for petroleum oils, particularly lubricating oils, comprising a copolymer of ethylene with one or more $C_3$ to $C_{28}$ alpha-olefins, preferably propylene, which have been grafted with acid moieties, e.g. maleic anhydride, preferably using a free radical initiator in a solvent, preferably lubricating oil, and then reacted with a mixture of a carboxylic acid component, preferably an alkyl succinic anhydride, and a polyamine having two or more primary amine groups. Or the grafted polymer may be reacted with said acid component prereacted with said polyamine to form salts, amides, imides, etc. and then reacted with said grafted olefin polymer. These reactions can permit the incorporation of varnish inhibition and dispersancy into the ethylene copolymer while inhibiting cross-linking or gelling.

U.S. Pat. No. 4,632,769, also incorporated herein by reference, discloses oil soluble viscosity improving ethylene copolymers such as copolymers of ethylene and propylene, reacted or grafted with ethylenically unsaturated carboxylic acid moieties, preferably maleic anhydride moieties, and then reacted with polyamines having two or more primary amine groups and a $C_{22}$ to $C_{28}$ olefin carboxylic acid component, preferably alkylene polyamine and alkenyl succinic anhydride, respectively. These reactions can permit the incorporation of varnish inhibition and dispersancy into the ethylene copolymer while inhibiting cross-linking or gelling.

While these additives are very useful oil compositions, particularly concentrates, thereof tend to exhibit increased viscosity over an extended period of time. Therefore, there exist a need for additives whose oil solutions, particularly oil concentrates, exhibit less viscosity change over an extended period of time.

The source of the viscosity increase over an extended period of time of oil solutions of these additives appears to be, at least in part, due to the chain extension of the polymer. Several solutions to this problem are described in the prior art. One solution is to use the polyamines and then to react the remaining unreacted primary amino groups with acid anhydrides of either $C_1$–$C_{30}$ monocarboxylic acid, preferably acetic anhydride, or unsubstituted or $C_1$ to $C_8$ hydrocarbyl substituted dicarboxylic acid anhydrides of U.S. Pat. No. 4,137,185; or the sulfonic acids of U.S. Pat. No. 4,144,181. These materials act as polyamine group end-capping or inactivating agents to inhibit or limit chain extension. That is to say, the reaction product of the graft copolymer of the ethylenically unsaturated dicarboxylic acid material and polyamine is post-treated with these acid materials to inhibit chain extension and viscosity increase of the imide grafted ethylene copolymer.

While the end-capping or amine inactivating agents disclosed in U.S. Pat. Nos. 4,137,185 and 4,144,181 are generally quite useful, their utilization results in some problems under certain conditions. Thus, for example, reacting a monocarboxylic acid anhydride, e.g., acetic anhydride, with the polyamine yields an acid by-product, e.g., acetic acid. This acid is deleterious to engine operation, causing corrosion, and generally needs to be removed from the oil solution of the V.I. improver-dispersant. Furthermore, the use of the unsubstituted or lower hydrocarbyl substituted dicarboxylic acid anhydrides of U.S. Pat. No. 4,137,185 generally does not remedy, and may sometimes even contribute to, the formation of haze in oil solutions of the imide grafted ethylene copolymer. This is due to the fact that when using free radical initiators with mineral oil as the grafting medium a proportion of the oil molecules in turn become grafted with the ethylenically unsaturated moiety, e.g., maleic anhydride, and upon subsequent reaction with the amine these grafted oil particles tend to become insoluble and to form haze. Upon the addition of the hydrocarbyl substituted dicarboxylic acid anhydrides to this oil solution to inactivate the unreacted primary amine groups of the imide grafted ethylene copolymer, a certain proportion of the anhydride reacts with the free amine groups of the grafted oil particles. Since the prior art anhydrides are either unsubstituted or lower hydrocarbyl substituted they do not facilitate the solubilization of these insoluble grafted oil particles. However, since the dicarboxylic acid anhydrides of the instant invention are substituted with a $C_{12}$ to $C_{18}$ hydrocarbyl group they tend to facilitate the solubilization of the insoluble grafted oil particles, thereby decreasing haze.

The use of the sulfonic acids of U.S. Pat. No. 4,144,181 may also result in the formation of undesirable acid by-products, e.g., hydrogen sulfide.

Furthermore, these prior art end-capping or primary amine inactivating agents do not, in all instances, provide a sufficient degree of viscosity stability for some applications to oil solutions of the additives of this invention.

It has been found that improved viscosity stability over an extended period of time of oil solutions, particularly oil concentrates, of the imide grafted ethylene copolymers of this invention can be achieved while remedying the problems of acid by-product formation and hazing accompanying the utilization of the prior art amine group end-capping or inactivating agents by utilizing a $C_{12}$ to $C_{18}$ hydrocarbyl substituted dicarboxylic acid anhydride as the polyamine end-capping or chain extension terminating agent.

SUMMARY OF THE INVENTION

The present invention is directed to oil soluble additives, particularly viscosity index improver-dispersant additives, for oleaginous materials whereby oil solutions thereof, particularly oil concentrates, exhibit improved viscosity stability over an extended period of time.

More particularly, the present invention is directed to oil-soluble, viscosity index improver-dispersant additives of ethylene copolymers, such as copolymers of ethylene and propylene; and ethylene, propylene and diolefin; etc, reacted or grafted with ethylenically unsaturated carboxylic acid moieties, preferably maleic anhydride moieties, and further reacted with polyamines having two or more primary amine groups and a carboxylic acid component, preferably alkylene polyamine and alkenyl succinic anhydride such as polyisobutenyl succinic anhydride, and subsequently post-treated or post-reacted with a viscosity stabilizing effective amount of at least one $C_{12}$ to $C_{18}$ hydrocarbyl substituted dicarboxylic acid anhydride amine end-capping or inactivating agent, whereby oil solutions of said additives are characterized by improved viscosity stability over an extended period of time.

The present invention is also directed to a process for improving the viscosity stability of an oil solution, particularly an oil concentrate, comprising an oleaginous solvent and from 0.1 to 50 wt.%, based on the total weight of said concentrate, of an imide grafted ethylene/$C_3$-$C_{28}$ alpha-olefin copolymeric oil additive comprising the step of post-treating or post-reacting said solution with a viscosity stabilizing effective amount of a $C_{12}$ to about $C_{18}$ hydrocarbyl substituted dicarboxylic acid anhydride.

DETAILED DESCRIPTION OF THE INVENTION

It has been discovered that post-reacting a $C_{12}$ to about $C_{18}$ hydrocarbyl substituted dicarboxylic acid anhydride with the reaction products of an ethylene copolymer grafted with ethylenically unsaturated carboxylic acid moieties, preferably maleic anhydride moieties, which is then reacted with a polyamine having two or more primary amine groups and a carboxylic acid component, preferably alkylene polyamine and alkenyl succinic anhydride such as polyisobutenyl succinic anhydride, yields a product whereby oil solutions, particularly concentrates, thereof are characterized by improved viscosity stability over prolonged periods of time.

The reaction products of an ethylene copolymer grafted with an ethylenically unsaturated carboxylic acid and then reacted with a polyamine having two or more primary amine groups and a carboxylic acid component, are disclosed in U.S. Pat. Nos. 4,517,104 and 4,632,769, both of which are incorporated herein by reference. These reaction products are subsequently reacted with $C_{12}$ to about $C_{18}$ hydrocarbyl substituted dicarboxylic acid anhydride to yield the stabilized grafted ethylene copolymers of the instant invention.

While not wishing to be bound by any theory it is believed that the viscosity stabilization involves the conversion of the residual unreacted primary amino groups, present in the reaction product of the ethylene copolymer grafted with ethylenically unsaturated acid moieties and then reacted with the polyamine and carboxylic acid component, to imide groups thereby inactivating said amine groups and limiting chain extension which occurs through said groups.

The reaction appears to involve imidation of the pendant unreacted primary amine groups by reaction with the $C_{12}$ to $C_{18}$ hydrocarbyl substituted dicarboxylic acid anhydride. This imidation of the unreacted primary amino groups with the anhydride of the instant invention produces an imide structure which limits the multi-functionalized copolymers propensity of solution chain extension thereby inhibiting viscosity increase of oil solutions containing the class of additives of the invention.

Ethylene Copolymer

Oil soluble ethylene copolymers used in the invention generally will have a number-average molecular weight ($\overline{M}_n$) of from about 5000 to about 500,000; preferably about 10,000 to 250,000 and optimally from about 20,000 to 100,000. In general, polymers useful as V.I. improvers will be used. These V.I. improvers will generally have a narrow range of molecular weight, as determined by the ratio of weight-average molecular weight ($\overline{M}_w$) to number-average molecular weight ($\overline{M}_n$). Polymers having a $\overline{M}_w/\overline{M}_n$ of less than 10, preferably less than 7, and more preferably 4 or less are most desirable. As used herein ($\overline{M}_n$) and ($\overline{M}_w$) are measured by the well known techniques of vapor phase osmometry (VPO), membrane osmometry and gel permeation chromotography. In general, polymers having a narrow range of molecular weight may be obtained by a choice of synthesis conditions such as choice of principal catalyst and cocatalyst combination, addition of hydrogen during the systhesis, etc. Post synthesis treatment such as extrusion at elevated temperature and under high shear through small orifices, mastication under elevated temperatures, thermal degradation, fractional precipitation from solution, etc. may also be used to obtain narrow ranges of desired molecular weights and to break down higher molecular weight polymer to different molecular weight grades for V.I. use.

These polymers are prepared from ethylene and ethylenically unsaturated hydrocarbons including cyclic, alicyclic and acyclic, containing from 3 to 28 carbons, e.g. 2 to 18 carbons. These ethylene copolymers may contain from 15 to 90 wt.% ethylene, preferably 30 to 80 wt.% of ethylene and 10 to 85 wt.%, preferably 20 to 70 wt.% of one or more $C_3$ to $C_{28}$, preferably $C_3$ to $C_{18}$ more preferably $C_3$ to $C_8$, alpha olefins. While not essential, such copolymers preferably have a degree of crystallinity of less than 25 wt.%, as determined by X-ray diffraction and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., are 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentenel, 4,4-dimethyl-1-pentene, and 6-methylheptene-1, etc., and mixtures thereof.

The term copolymer as used herein, unless otherwise indicated, includes terpolymers, tetrapolymers, etc., of ethylene, said $C_3$ to $C_{28}$ alpha-olefin and/or a non-conjugated diolefin or mixtures of such diolefins which may also be used. The amount of the non-conjugated diolefin will generally range from about 0.5 to 20 mole percent, preferably about 1 to about 7 mole percent, based on the total amount of ethylene and alpha-olefin present.

Representative examples of non-conjugated dienes that may be used as the third monomer in the terpolymer include:

a. Straight chain acyclic dienes such as: 1,4-hexadiene; 1,5-heptadiene; 1,6-octadiene.

b. Branched chain acyclic dienes such as: 5-methyl-1,4-hexadiene; 3,7-dimethyl 1,6-octadiene; 3,7-dimethyl 1,7-octadiene; and the mixed isomers of dihydro-myrcene and dihydro-cymene.

c. Single ring alicyclic dienes such as: 1,4-cyclohexadiene; 1,5-cyclooctadiene; 1,5-cyclododecadiene; 4-vinylcyclohexene; 1-allyl-4-isopropylidene cyclohexane; 3-allyl-cyclopentene; 4-allyl-cyclohexene and 1-isopropenyl-4-(4-butenyl)cyclohexane.

d. Multi-single ring alicyclic dienes such as: 4,4'-dicyclopentenyl and 4,4'-dicyclohexenyl dienes.

e. Multi-ring alicyclic fused and bridged ring dienes such as: tetrahydroindene; methyl tetrahydroindene; dicyclopentadiene; bicyclo (2.2.1) hepta-2,5-diene; alkyl, alkenyl, alkylidene, cycloalkenyl and cycloalkylidene norbornenes such as: ethyl norbornene; 5-methylene-6-methyl-2norbornene; 5-methylene-6,6-dimethyl-2-norbornene; 5-propenyl-2-norbornene; 5-(3-cyclopentenyl)2-norbornene and 5cyclohexylidene-2-norbornene; norbornadiene; etc.

Ethylenically Unsaturated Carboxylic Acid Material

These materials which are grafted (attached) onto the ethylene copolymer contain at least one ethylenic bond and at least one, preferably two, carboxylic acid groups, or an anhydride group, or a polar group which is convertible into said carboxyl groups by oxidation or hydrolysis. Maleic anhydride or a derivative thereof is preferred as it does not appear to homopolymerize appreciable but grafts onto the ethylene copolymer to give two carboxylic acid functionalities. Such preferred materials have the generic formula

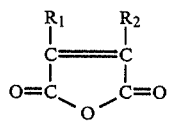

wherein R1 and R2 are hydrogen or a halogen. Suitable examples additionally include chloro-maleic anhydride, itaconic anhydride, or the corresponding dicarboxylic acids, such as maleic acid or fumaric acid or their monoesters, etc.

As taught by U.S. Pat. No. 4,160,739 and U.S. Pat. No. 4,161,452 various unsaturated comonomers may be grafted on the olefin copolymer together with the unsaturated acid component, e.g. maleic anhydride. Such graft monomer systems may comprise one or a mixture of comonomers different from the unsaturated acid component and which contain only one copolymerizable double bond and are copolymerizable with said unsaturated acid component.

Typically, such comonomers do not contain free carboxylic acid groups and are esters containing alpha-ethylenic unsaturation in the acid or alcohol portion; hydrocarbons, both aliphatic and aromatic, containing, alpha-ethylenic unsaturation, such as the $C_4$–$C_{12}$ alpha olefins, for example, hexene, nonene, dodecene, etc.; styrenes, for example styrene, alpha-methyl styrene, p-methyl styrene, butyl styrene, etc.; and vinyl monomers, for example vinyl acetate, vinyl chloride, vinyl ketones such as methyl and ethyl vinyl ketone, and nitrogen containing vinyl monomer such as vinyl pyridine and vinyl pyrollidine, etc. Comonomers containing functional groups which may cause crosslinking, gelatin or other interfering reactions should be avoided, although minor amounts of such comonomers (up to about 10% by weight of the comonomer system) often can be tolerated.

Specific useful copolymerizable comonomers include the following:

(A) Esters of saturated acids and unsaturated alcohols wherein the saturated acids may be monobasic or polybasic acids containing up to about 40 carbon atoms such as the following: acetic, propionic, butyric, valeric, caproic, stearic, oxalic, malonic, succinic, glutaric, adipic, pimelic, suberic, azelaic, sebacic, phthalic, isophthalic, terephthalic, hemimellitic, trimellitic, trimesic and the like, including mixtures. The unsaturated alcohols may be monohydroxy or polyhydroxy alcohols and may contain up to about 40 carbon atoms, such as the following: allyl, methallyl, crotyl, 1-chloroallyl, 2-chloroallyl, cinnamyl, vinyl, methyl, vinyl, 1-phenallyl, butenyl, propargyl, 1-cyclohexene-3-ol, oleyl, and the like, including mixtures.

(B) Esters of unsaturated monocarboxylic acids containing up to about 12 carbon atoms such as acrylic, methacrylic and crotonic acid, and an esterifying agent containing up to about 50 carbon atoms, selected from saturated alcohols and alcohol epoxides. The saturated alcohols may preferably contain up to about 40 carbon atoms and include monohydroxy compounds such as: methanol, ethanol, propanol, butanol, 2-ethylhexanol, octanol, dodecanol, cyclohexanol, cyclopentanol, neopentyl alcohol, and benzyl alcohol; and alcohol ethers such as the monomethyl or monobutyl ethers of ethylene or propylene glycol, and the like, including mixtures. The alcohol epoxides include fatty alcohol epoxides, glycidol, and various derivatives of alkylene oxides, epichlorohydrin, and the like, including mixtures.

The components of the graft copolymerizable system are used in a ratio of unsaturated acid monomer component to comonomer component of about 1:4 to 4:1, preferably about 12 to 2:1 by weight.

Grafting of the Ethylene Copolymer

The grafting of the ethylene copolymer with the carboxylic acid material may be by any suitable method, such as thermally by the "ene" reaction, using copolymers containing unsaturation, such as ethylene-propylene-diene polymers either chlorinated or unchlorinated, or more preferably it is by free-radical induced grafting in solvent, preferably in a mineral lubricating oil as solvent.

The radical grafting is preferably carried out using free radical initiators such as peroxides, hydroperoxides, and azo compounds and preferably those which have a boiling point greater than about 100° C. and which decompose thermally within the grafting temperature range to provide said free radicals. Representative of these free-radical initiators are azobutyro-nitrile, 2,5-dimethyl-hex-3-yne-2, 5 bis-tertiary-butyl peroxide (sold as Lupersol 130) or its hexane analogue, di-tertiary butyl peroxide and dicumyl peroxide. The initiator is generally used at a level of between about 0.005% and about 1%, based on the total weight of the polymer solution, and temperatures of about 150° to 220° C.

The ethylenically unsaturated carboxylic acid material, preferably maleic anhydride, will be generally used in an amount ranging from about 0.01% to about 10%, preferably 0.1 to 2.0%, based on weight of the initial total solution. The aforesaid carboxylic acid material and free radical initiator are generally used in a weight percent ratio range of 1.0:1 to 30:1, preferably 3.0:1 to 6:1.

The initiator grafting is preferably carried out in an inert atmosphere, such as that obtained by nitrogen blanketing. While the grafting can be carried out in the presence of air, the yield of the desired graft polymer is generally thereby decreased as compared to grafting under an inert atmosphere substantially free of oxygen. The grafting time will usually range from about 0.1 to 12 hours, preferably from about 0.5 to 6 hours, more preferably 0.5 to 3 hours. The graft reaction will be usually carried out to at least approximately 4 times, preferably at least about 6 times the half-life of the free-radical initiator at the reaction temperature employed, e.g. with 2,5-dimethyl hex-3-yne-2, 5-bis(t-butyl peroxide) 2 hours at 160° C. and one hour at 170° C., etc.

In the grafting process, usually the copolymer solution is first heated to grafting temperature and thereafter said unsaturated carboxylic acid material and initiator are added with agitation, although they could have been added prior to heating. When the reaction is complete, the excess acid material can be eliminated by an inert gas purge, e.g. nitrogen sparging. Preferably the carboxylic acid material that is added is kept below its solubility limit in the polymer solution, e.g. below about 1 wt.%, preferably below 0.4 wt.% or less, of free maleic anhydride based on the total weight of polymer-solvent solution, e.g. ethylene copolymer-mineral lubricating oil solution. Continuous or periodic addition of the carboxylic acid material along with an appropriate portion of initiator, during the course of the reaction, can be utilized to maintain the carboxylic acid below its solubility limits, while still obtaining the desired degree of total grafting.

In the initiator grafting step the maleic anhydride or other carboxylic acid material used will be grafted onto both the polymer and the solvent for the reaction. Many solvents such as dichlorobenzene are relatively inert and may be only slightly grafted, while mineral oil will tend to be more grafted. The exact split of graft between the substrate present depends upon the polymer and its reactivity, the reactivity and type of oil, the concentration of the polymer in the oil, and also upon the maintenance of the carboxylic acid material in solution during the course of the reaction and minimizing the presence of dispersed, but undissolved acid, e.g. the maleic anhydride. The undissolved acid material appears to have an increased tendency to react to form oil insoluble materials as opposed to dissolved acid material. The split between grafted oil and grafted polymer may be measured empirically from the infrared analyses of the product dialyzed into oil and polymer fractions.

The grafting is preferably carried out in a mineral lubricating oil which need not be removed after the grafting step but can be used as the solvent in the subsequent reaction of the graft polymer with the amine material an as a solvent for the end product to form the lubricating additive concentrate. The oil having attached, grafted carboxyl groups, when reacted with the amine material will also be converted to the corresponding derivatives.

The solution grafting step when carried out in the presence of a high temperature decomposable peroxide can be accomplished without substantial degradation of the chain length (molecular weight) of the ethylene containing polymer. This can be an advantage as opposed to high temperature thermal reactions which depend on degradation to apparently form free radical reactive sites. Measurement of molecular weights and degradation can be evaluated by determination of the thickening efficiency (T.E.) of the polymer as will later be described.

The Amines

The amine component will have two or more primary amine groups, wherein the primary amine groups may be unreacted, or wherein one of the amine groups may already be reacted.

Particularly preferred amine compounds have the following formulas:

(A) alkylene polyamines

wherein x is an integer of about 1 to 10, preferably about 2 to 7, and the alkylene radical having 2 to 7, preferably about 2 to 4 carbon atoms;

(B) polyoxyalkylene polyamines $$NH_2-\text{alkylene}-[O-\text{alkylene}\,]_{\overline{m}}-NH_2 \qquad (i)$$

where m has a value of about 3 to 70 and preferably 10 to 35; and $$R-[\text{alkylene}-[O-\text{alkylene}\,]_{\overline{n}}NH_2]_{3-6} \qquad (ii)$$

where n has a value of about 1 to 40 with the provision that the sum of all the n's is from about 3 to about 70 and preferably from about 6 to about 35 and R is a polyvalent saturated hydrocarbon radical of up to ten carbon atoms having a valence of 3 to 6. The alkylene groups in either formula (i) or (ii) may be straight or branched chains containing about 2 to 7, and preferably about 2 to 4 carbon atoms.

Examples of the alkylene polyamines of formula (A) above include methylene amines, ethylene amines, butylene amines, propylene amines, pentylene amines, hexylene amines, heptylene amines, octylene amines, other polymethylene amines, the cyclic and higher homologs of these amines such as the piperazines, the amino-alkyl-substituted piperazines, etc. These amines include, for example, ethylene diamine, diethylene triamine, triethylene tetramine, propylene diamine, di(-heptamethylene) triamine, tripropylene tetramine, tetraethylene pentamine, trimethylene diamine, pentaethylene hexamine, di(trimethylene) triamine, 2-heptyl-3-(2-aminopropyl) imidazoline, 4-methylimidazoline, 1,3-bis-(2-aminoethyl) imidazoline, pyrimidine, 1-(2-aminopropyl) piperazine, 1,4-bis-(2-aminoethyl) piperazine, N,N-dimethylaminopropyl amine, N,N-dioctylethyl amine, N-octyl-N'-methylethylene dimaine, 2-methyl-1-(2-aminobutyl) piperazine, etc. Other higher homologs which may be used can be obtained by condensing two or more of the above-mentioned alkylene amines in a known manner.

The ethylene amines which are particularly useful are described, for example, in the Encyclopedia of Chemical Technology under the heading of "Ethylene Amines" (Kirk and Othmer), Volume 5, pgs. 898–905; Interscience Publishers, New York (1950). These compounds are prepared by the reaction of an alkylene chloride with ammonia. This results in the production of a complex mixture of alkylene amines, including cyclic condensation products such as piperazines. While mixtures of these amines may be used for purposes of this invention, it is obvious that pure alkylene amines may be used with complete satisfaction.

The polyoxyalkylene polyamines of formula (B) above, preferably polyoxyalkylene diamines and polyoxyalkylene triamines, may have average molecular weights ranging from about 200 to about 4000 and preferably from about 400 to about 2000. The preferred polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

The Acid Component

The acid component includes: hydrocarbyl substituted succinic anhydride or acid having 12 to 49 carbons, preferably 16 to 49 carbons in said hydrocarbyl group; long chain monocarboxylic acid of the formula RCOOH where R is a hydrocarbyl group of 50 to 400 carbons and long chain hydrocarbyl substituted succinic anhydride or acid having 50 to 400 carbons in said hydrocarbyl group. Said hydrocarbyl groups are essentially aliphatic and include alkenyl and alkyl groups. The longer chain acids and anhydrides are preferred, particularly when the grafting reaction is carried out in lubricating oil because of ability to impart dispersancy to reacted oil molecules as well as their greater solubilizing effect.

Primarily because of its ready availability and low cost, the hydrocarbyl portion, e.g. alkenyl groups, of the carboxylic acid or anhydride is preferably derived from a polymer of a $C_2$ to $C_5$ monoolefin, said polymer generally having a molecular weight of about 140 to 6500, e.g. 700 to about 5000, most preferably 700 to 3000 molecular weight. Particularly preferred is polyisobutylene. These are acids described in U.S. Pat. Nos. 4,517,104 and 4,632,769, which are incorporated herein by reference.

Pre-Reacted Amine—Acid Component

The aforesaid amine and acid component may be prereacted, with the acid being generally attached to the amine through salt, imide, amide, amidine, ester, or other linkages so that a primary amine group of the polyamine is still available for reaction with the acid moieties of the grafted polymer. A convenient source of these prereacted materials are the well-known lubricating oil dispersants, provided they retain primary amine groups capable of further reaction with the grafted polymer.

Usually, these dispersants are made by condensing a hydrocarbyl substituted monocarboxylic acid or a dicarboxylic acid, having about 50 to 400 carbons in the hydrocarbyl substituent, as described above under "The Acid Component", preferably a succinic acid producing material such as alkenyl succinic anhydride, with an amine or polyamine, including those described above under "The Amines".

Monocarboxylic acid dispersants have been described in U.K. Patent Specification No. 983,040. Here, polyamines are reacted with the high molecular weight mono carboxylic acid derived from a polyolefin, such as polyisobutylene, by oxidation with nitric acid or oxygen; or by addition of halogen to the polyolefin followed by hydrolyzing and oxidation; etc. Another method is taught in Belgian Pat. No. 658,236, incorporated herein by reference where polyolefin, such as the polymers of $C_2$ to $C_5$ monoolefin, e.g. polypropylene or polyisobutylene, is halogenated, e.g. chlorinated, and then condensed with an alpha, beta-unsaturated, monocarboxylic acid of from 3 to 8, preferably 3 to 4, carbon atoms, e.g. acrylic acid, alpha-methyl-acrylic acid, i.e., 2-methyl propenoic acid, crotonic acid, etc., and then reacted with polyamine.

Formation of dicarboxylic acid dispersant by reaction of an amine with alkenyl succinic anhydride prepared from the reaction of a polyolefin or chlorinated polyolefin and maleic anhydride, etc. is well known in the art, as seen in U.S. Pat. No. 3,272,746, incorporated herein by reference.

Most preferred are the lubricating oil dispersants made by reaction of the aforesaid "(A) alkylene polyamines" previously described, with alkenyl succinic anhydride.

Reaction, preferably amination and/or imidation of the carboxylic acid material is usefully done as a solution reaction with the acid material, usually polyisobutenylsuccinic anhydride, dissolved in a solvent such as mineral oil, to which the other reactant is added. The formation of the dispersants in high yield can be effected by adding from about 0.5 to 3.3, preferably about 0.7 to 1.3, most preferably about 1 to 1 molar proportions of the alkylene polyamine per molar proportion of alkenyl succinic anhydride to said solution and heating the mixture at 140° C. to 165° C. or higher until the appropriate amount of water of reaction is evolved. Typically the mineral oil solvent is adjusted so that it constitutes 50% by weight of the final acyl nitrogen compound solution.

Reaction of Grafted Ethylene Copolymer with Amine and Acid Component

The grafted polymer, preferably in solution generally equal to about 5 to 30wt. %, preferably 10 to 20 wt. % polymer, can be readily reacted with a mixture of amine and acid components, or with said pre-reacted amine and acid, by admixture together with said grafted polymer and heating at a temperature of from about 100° C. to 250° C., preferably from 150° to 200° C., for from about 0.1 to 10 hours, usually about 0.1 to about 2 hours. The heating is preferably carried out to favor formation of imides rather than amides and salts. Thus, imide formation will give a lower viscosity of the reaction mixture than amide formation and particularly lower than salt formation. This lower viscosity permits the utilization of a higher concentration of grafted ethylene copolymer in the reaction mixture. Removal of water assures completion of the imidation reaction. Reaction ratios can vary considerably, depending upon the reactants, amounts of excess, type of bonds formed, etc. Generally from about 1 to 2, preferably about 1 mole of said bi-primary amine, and about 1 to 4, preferably about 1.5 to 3, most preferably about 2 mole equivalent of said acid component (e.g. 2 moles of monocarboxylic or 1 mole of dicarboxylic acid component), is preferably used, per mole of the grafted dicarboxylic acid moiety content, e.g. grafted maleic anhydride content. Alternatively, if pre-reacted amine and acid component is used, such as a dispersant, sufficient dispersant is used to give about 1 to 2 primary amine groups per dicarboxylic acid moiety in the grafted polymer, depending on whether primarily imides or amides are formed. Usually 1 to 2 moles of said dispersant is used per molar amount of said dicarboxylic acid moieties in the grafted polymer. For example, with an ethylene-propylene copolymer of about 40,000 ($\overline{M}_n$), i.e. a thickening efficiency of about 2.1, and averaging 4 maleic anhydride groups per molecule, and making imides, about 4 moles of amine with two primary groups and about 4 moles of alkenyl succinic anhydride would preferably be used per mole of grafted copolymer.

The $C_{12}$ to $C_{18}$ Hydrocarbyl Substituted Dicarboxylic Acid Anhydride In accordance with the instant invention the imidazation product described hereinafore is subsequently reacted or post-treated with a $C_{12}$ to about $C_{18}$, preferably $C_{12}$ to $C_{18}$, hydrocarbyl substituted dicarboxylic acid anhydride. The particular type of dicarboxylic acid anhydride used is critical to the present invention, and must be a $C_{12}$ to about $C_{18}$ hydrocarbyl substituted dicarboxylic acid anhydride. The anhydride used in the present invention may be represented by the general formula RX wherein R is a hydrocarbyl group containing a total of 12 to about 18, preferably 12 to 16, more preferably 12 to 14, and most preferably 12, carbons, which are essentially aliphatic, saturated or unsaturated, and include alkenyl and alkyl groups, and can be straight chain or branched. When R is an alkenyl group it is preferred that the olefinic unsaturation site be located near the anhydride, i.e., X, moiety. The radical X will usually contain 4 to 10, preferably 4 to 8, more preferably 4 to 6, and most preferably 4, carbon atoms and will define a dicarboxylic acid anhydride. The X radical may be represented by the formula

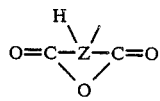

wherein Z is selected from alkylene and alkenylen radicals containing from 2 to 8, preferably 2 to 6, more preferably 2 to 4, and most preferably 2 carbon atoms. Preferably Z is a alkenylene radical. The most preferred X radical is the succinic anhydride radical, i.e.,

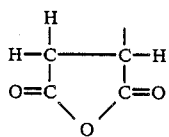

The X radical is linked to the R group by a carbon linkage.

Dicarboxylic acid anhydride materials of the above types and methods for their production are well known. Alkenyl substituted dicarboxylic acid anhydrides can be made by the reaction of the $C_{12}$ to about $C_{18}$ alpha mono-olefin, or chlorinated mono-olefin, with maleic anhydride, e.g., European application 82-302326.2, incorporated herein by reference. Hydrogenation can give the corresponding alkyl derivative.

As mentioned hereinbefore it is critical to the present invention that this acid component be a $C_{12}$ to about $C_{18}$ hydrocarbyl substituted dicarboxylic acid anhydride. If an acid instead of an anhydride is used there will generally be no significant improvement in viscosity stability. Thus, patents or literature disclosing the use of acids themselves with amines are not relevant to the present invention. Furthermore, the use of an acid itself, particularly a monocarboxylic acid, or a monocarboxylic acid anhydride, results in the formation of an acid by-product which is deleterious to the end use of the oleaginous composition containing the V.I. improver—dispersant of the present invention, e.g., causes corrosion.

If the dicarboxylic acid anhydride contains no hydrocarbyl substituent groups, e.g., succinic anhydride, or if it contains a hydrocarbyl substituent group of less than 12 carbon atoms its effectiveness in solubilizing the insoluble grafted oil particles, produced during the free radical grafting in an oil medium of the ethylene copolymer, is adversely affected. Thus, such dicarboxylic acid anhydrides are generally ineffective in reducing the haze of the grafted ethylene copolymer/oil solution. This, in turn, requires an additional haze-treating step described in U.S. Pat. No. 4,137,185. The use of the $C_{12}$ to $C_{18}$ hydrocarbyl substituted dicarboxylic acid anhydrides of the instant invention is effective in solubilizing the grafted oil particles, thereby reducing haze and generally eliminating the need for a haze-treating step.

The amount of the hydrocarbyl substituted dicarboxylic acid anhydride component utilized is a viscosity stabilizing effective amount. By viscosity stabilizing effective amount is meant any amount which is effective to stabilize the viscosity of an oleaginous solution of the derivatized ethylene copolymers, i.e., inhibit or retard the increase in viscosity over an extended period of time of an oil solution, particularly an oil concentrate, of the grafted ethylene polymers. Generally this amount is from about 0.5-2.5, preferably 1-1.5 moles of $C_{12}$ to about $C_{18}$ hydrocarbyl substituted dicarboxylic acid anhydride per mole of unreacted primary amino group of the ethylene copolymer grafted with an ethylenically—unsaturated carboxylic acid material and thereafter reacted with the polyamine containing at least two primary amine groups and the carboxylic acid.

The chain extension termination or end-capping of the grafted ethylene copolymer which was preferentially prepared in a mineral oil solution can be conducted by subsequently injecting the $C_{12}$ to about $C_{18}$ hydrocarbyl substituted dicarboxylic acid anhydride of the present invention directly into the reaction system used to prepare said grafted ethylene copolymer, or in can be a separate non-integrated reaction step. In any event, the grafted ethylene copolymer is first produced by prepared the graft copolymer of ethylene and ethylenically unsaturated carboxylic acid and then reacting this graft copolymer with at least one polyamine and carboxylic acid component, and this preformed copolymer is then subsequently reacted or treated with the $C_{12}$ to $C_{18}$ hydrocarbyl substituted dicarboxylic acid anhydride in a end-capping or chain extension limiting step. A sufficient amount of the hydrocarbyl substituted dicarboxylic acid anhydride is introduced into the heated solution containing the imide grafted ethylene copolymer and the reaction carried on for a period of about 0.25 to 8 hours at a temperature ranging from about 50° to 250° C., a temperature of about 100° to 200° C. being preferred. In order to fully complete the reaction, it is generally useful to utilize a slight excess, i.e., about 1 to 30, more usually about 1 to 10, percent by weight of the hydrocarbyl substituted dicarboxylic anhydride. The entire reaction is carried out under an inert atmosphere, for example, a nitrogen blanket.

The chain extension limiting or end-capping process step is preferentially conducted on a grafted ethylene copolymeric mineral oil solution wherein the excess poly(primary amine), e.g., alkylene polyamine, is reduced to a level of less than about 0.05, optimally less than about 0.02, weight percent free (unreacted) amine.

A minor amount, e.g. 0.01 up to 50 wt %, preferably 0.05 to 25 wt. %, based on the weight of the total composition, of the oil-soluble nitrogen-containing graft ethylene copolymers produced in accordance with this invention can be incorporated into a major amount of an oleaginous material, such as a lubricating oil or hydrocarbon fuel, depending upon whether one is forming finished products or additive concentrates. When used in lubricating oil compositions, e.g. automotive or diesel crankcase lubricating oil, the endcapped nitrogen-containing grafted copolymer concentrations are usually within the range of about 0.01 to 10 wt %, of the total composition. The lubricating oils to which the products of this invention can be added include not only hydrocarbon oil derived from petroleum, but also include synthetic lubricating oils such as esters of dibasic acids; complex esters made by esterifications of monobasic acids, polyglycols, dibasic acids and alcohols; polyolefin oils, etc.

The endcapped nitrogen-containing graft polymers of the invention may be utilized in a concentrate form, e.g., from about 5 wt % up to about 50 wt. %, preferably 7 to 25 wt. %, in oil, e.g., mineral lubricating oil, for ease of handling, and may be prepared in this form by carrying out the reaction of the invention in oil as previously discussed.

The above oil compositions may optionally contain other conventional additives such as pour point depressants, antiwear agents, antioxidants, other viscosity-index improvers, dispersants, corrosion inhibitors, antifoaming agents, detergents, rust inhibitors, friction modifiers, and the like.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt. % of a sulfide of phosphorus for ½ to 15 hours, at a temperature in the range of about 66 to about 316. C. Neutralization of the phosphosulfurized hydrocarbon may be effected in the manner taught in U.S. Pat. No. 1,969,324.

Oxidation inhibitors, or antioxidants, reduce the tendency of mineral oils to deteriorate in service which deterioration can be evidenced by the products of oxidation such as sludge and varnish-like deposits on the metal surfaces, and by viscosity growth. Such oxidation inhibitors include alkaline earth metal salts of alkylphenolthioesters having preferably $C_5$ to $C_{12}$ alkyl side chains, e.g., calcium nonylphenol sulfide, barium toctylphenyl sulfide, dioctylphenylamine, phenylalphanaphthylamine, phospho-sulfurized or sulfurized hydrocarbons, etc.

Other oxidation inhibitors or antioxidants useful in this invention comprise oil-soluble copper compounds. The copper may be blended into the oil as any suitable oilsoluble copper compound. By oil soluble it is meant that the compound is oil soluble normal blending conditions in the oil or additive package. The copper compound may be in the cuprous or cupric form. The copper may be in the form of the copper dihydrocarbyl thio- or dithio-phosphates. Alternatively, the copper may be added as the copper salt of a synthetic or natural carboxylic acid. Examples of same thus include $C_{10}$ to $C_{18}$ fatty acids, such as stearic or palmitic acid, but unsaturated acids such as oleic or branched carboxylic acids such as naphthenic acids of molecular weights of from about 200 to 500, or synthetic carboxylic acids, are preferred, because of the improved handling and solubility properties of the resulting copper carboxylates. Also useful are oil-soluble copper dithiocarbamates of the general formula $(RR,NCSS)nCu$ (where n is 1 or 2 and R and R, are the same or different hydrocarbyl radicals containing from 1 to 18, and preferably 2 to 12, carbon atoms, and including radicals such as alkyl, alkenyl, aryl, aralkyl, alkaryl and cycloaliphatic radicals. Particularly preferred as R and R, groups are alkyl groups of from 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R,) will generally be about 5 or greater. Copper sulphonates, phenates, and acetylacetonates may also be used.

Exemplary of useful copper compounds are copper CuI and/or CuII salts of alkenyl succinic acids or anhydrides. The salts themselves may be basic, neutral or acidic. They may be formed by reacting (a) polyalkylene succinimides (having polymer groups of Mn of 700 to 5,000) derived from polyalkylene-polyamines, which have at least one free carboxylic acid group, with (b) a reactive metal compound. Suitable reactive metal compounds include those such as cupric or cuprous hydroxides, oxides, acetates, borates, and carbonates or basic copper carbonate.

Examples of these metal salts are Cu salts of polyisobutenyl succinic anhydride, and Cu salts of polyisobutenyl succinic acid. Preferably, the selected metal employed is its divalent form, e.g., $Cu+2$. The preferred substrates are polyalkenyl succinic acids in which the alkenyl group has a molecular weight greater than about 700. The alkenyl group desirably has a $M_n$ from about 900 to 1,400, and up to 2,500, with a $M_n$ of about 950 being most preferred. Especially preferred is polyisobutylene succinic anhydride or acid. These materials may desirably be dissolved in a solvent, such as a mineral oil, and heated in the presence of a water solution (or slurry) of the metal bearing material. Heating may take place between 70. and about 200. C. Temperatures of 110. C. to 140. C. are entirely adequate. It may be necessary, depending upon the salt produced, not to allow the reaction to remain at a temperature above about 140. C. for an extended period of time, e.g., longer than 5 hours, or decomposition of the salt may occur.

The copper antioxidants (e.g., Cu-polyisobutenyl succinic anhydride, Cu-oleate, or mixtures thereof) will be generally employed in an amount of from about 50 to 500 ppm by weight of the metal, in the final lubricating or fuel composition.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutyenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinamic acid and mixtures thereof; U.S. Pat. No. 3,879,306 which discloses N(hydroxyalkyl)alkenyl-succinamic acids or succinimides; U.S. Pat. No. 3,932,290 which discloses reaction products of di-(lower alkyl)phosphites and epoxides; and U.S. Pat. No. 4,028,258 which discloses the alkylene oxide adduct of phosphosulfurized N-(hydroxyalkyl)alkenyl succinimides. The disclosures of the above references are herein incorporated by reference. The most preferred friction modifiers are succinate esters, or metal salts thereof, of hydrocarbyl substituted succinic acids or anhydrides and thiobisalkanols such as described in U.S. Pat. No. 4,344,853.

Dispersants maintain oil insolubles, resulting from oxidation during use, in suspension in the fluid thus preventing sludge flocculation and precipitation or deposition on metal parts. Suitable dispersants include high molecular weight alkyl succinimides, the reaction product of oil-soluble polyisobutylene succinic anhydride with ethylene amines such as tetraethylene pentamine and borated salts thereof.

Pour point depressants, otherwise known as lube oil flow improvers, lower the temperature at which the fluid will flow or can be poured. Such additives are well known. Typically of those additives which usefully optimize the low temperature fluidity of the fluid are $C_8$–$C_{18}$ dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representative of conventional antiwear agents are zinc dialkyldithiophosphate and zinc diaryldithiophosphate.

Detergents and metal rust inhibitors include the metal salts of sulphonic acids, alkyl phenols, sulfurized alkyl phenols, alkyl salicylates, naphthenates and other oil soluble mono- and di-carboxylic acids. Highly basic (viz, overbased) metal sales, such as highly basic alkaline earth metal sulfonates (especially Ca and Mg salts) are frequently used as detergents. Representative examples of such materials, and their methods of preparation, are found in co-pending Ser. No. 754,001, filed July 11, 1985, the disclosure of which is hereby incorporated by reference.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Additive | Wt. % a.i. (Broad) | Wt. % a.i. (Preferred) |
| --- | --- | --- |
| Viscosity Modifier | .01–12 | .01–4 |
| Corrosion Inhibitor | 0.01–5 | .01–1.5 |
| Oxidation Inhibitor | 0.01–5 | .01–1.5 |
| Dispersant | 0.1–20 | 0.1–8 |
| Pour Point Depressant | 0.01–5 | .01–1.5 |
| Anti-Foaming Agents | 0.001–3 | .001–0.15 |
| Anti-Wear Agents | 0.001–5 | .001–1.5 |
| Friction Modifiers | 0.01–5 | .01–1.5 |
| Detergents/Rust Inhibitors | .01–10 | .01–3 |
| Mineral Oil Base | Balance | Balance |

When other additives are employed, it may be desirable, although not necessary, to prepare additive concentrates comprising concentrated solutions or dispersions of the dispersant (in concentrate amounts hereinabove described), together with one or more of said other additives (said concentrate when constituting an additive mixture being referred to here in as an additive package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the dispersant additive and optional additional additives in proper amounts to provide the desired concentration in the final formulation when the additive-package is combined with a predetermined amount of base lubricant. Thus, the products of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

The final formulations may employ typically about 10 wt. % of the additive-package with the remainder being base oil.

All of said weight percents expressed herein are based on active ingredient (a.i.) content of the additive, and/or upon the total weight of any additive-package, or formulation which will be the sum of the a.i. weight of each additive plus the weight of total oil or diluent.

As mentioned hereinafore, the $C_{12}$ to about $C_{18}$ hydrocarbyl substituted dicarboxylic acid anhydride end-capped imide grafted ethylene copolymers of the present invention are particularly useful as fuel and lubricating oil additives.

The end-capped imide grafted ethylene copolymers of this invention find their primary utility, however, in lubricating oil compositions, which employ a base oil in which these copolymers are dissolved or dispersed.

Thus, base oils suitable for use in preparing the lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols; polyalpha-olefins, polybutenes, alkyl benzenes, organic esters of phosphoric acids, polysilicone oils, etc.

The imide grafted ethylene copolymers endcapped with the $C_{12}$ to about $C_{18}$ hydrocarbyl substituted dicarboxylic acid anhydrides, preferably succinic anhydride, are oil-soluble, dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the additives, for instance, are soluble or stably dispersible in oil to an extent sufficient to exert their intended effect in the environment in which the oil is employed. Moreover, the additional incorporation of other additives may also permit incorporation of higher levels of a particular copolymer hereof, if desired.

Accordingly, while any effective amount, i.e., dispersant or viscosity index improving-dispersant effective amount, of the additives of the present invention can be incorporated into the fully formulated lubricating oil composition, it is contemplated that such effective amount be sufficient to provide said lube oil composition with an amount of the additive of typically from about 0.01 to about 10, preferably 0.1 to 6.0, and more preferably from 0.25 to 3.0 wt. %, based on the weight of said composition.

The following examples, which include preferred embodiments and wherein all parts are by weight unless otherwise indicated, further illustrate the present invention.

The following two Examples illustrate imide grafted ethylene-propylene copolymers falling outside the scope of the instant invention. They are presented for comparative purposes only.

EXAMPLE 1

This example, illustrates the preparation of a non-endcapped imide grafted ethylene-propylene copolymer.

A reactor vessel is charged with 44,702 pounds of a 20 wt. % oil solution of an ethylene-propylene copolymer containing about 43 wt. % ethylene and about 57 wt. % propylene, and having a T.E. in S100N (Solvent 100 neutral mineral oil). The solution is heated, with stirring, to 350° F. under nitrogen sparge. Four-hundred fifty pounds of maleic anhydride is then charged into the reactor vessel under a nitrogen blanket over a 45 minute period, followed by a 360 pounds of S200N oil flush. Ten minutes after starting the maleic anhydride charge 90 pounds of ditertiary butyl peroxide as a free radical initiator begin to be charged into the reactor vessel at a rate of 1.5 gallons per minute, followed by 360 pounds S100N oil flush. This reaction mixture is heated at 350° F. for 0.5 hour. The by-product and unreacted maleic anhydride are sparged off with nitrogen at 350° F. for 90 minutes. During the last 30 minutes of sparging 6,352 pounds of polyisobutenyl succinic anhydride (having a $M_n$ of 950 and an ASTM Saponification No. of 112) are added to the reaction mixture followed by 180 pounds of S100N oil flush. Then 516 pounds of diethylene triamine are charged to the reactor at a rate of 1.5 gallons per minute. Heating of this reaction mixture is continued for one hour at 350° F. The reaction by-products are then sparged off with nitrogen at 350° F. for a period of 60 minutes. The reaction mixture is then diluted with an amount of S100N mineral oil sufficient to reduce the viscosity of said reaction mixture to about 950 centistokes at 100° C.

The kinematic viscosity (K.V.) in centistokes of this diluted reaction mixture is measured, at 100° C., both initially and after storage for 6 weeks at 60° C., 80° C. and 100° C., respectively. The results are set forth in Tables I–III.

EXAMPLE 2

This example illustrates the preparation of a sulfonic acid endcapped imide grafted ethylene-propylene copolymer. A reactor vessel is charged with 690 grams of an imide grafted ethylene-propylene copolymer oil solution prepared substantially in accordance with the procedure of Example 1. The solution is heated to 150° C. under a nitrogen blanket. To this heated solution are added 9.39 grams (1.36 wt. %, 0.0184 mole) of a $C_{24}$ average alkyl benzene sulfonic acid having a number average molecular weight of about 510. Heating of this reaction mixture is continued at 150° C. for 0.5 hour. The oil solution of the resultant product is cooled to 100° C. and discharged from the reactor.

The kinematic viscosity, at 100° C., of this reaction product oil solution is determined initially and after storage for 6 weeks at 60° C., 80° C., and 100° C., respectively, and the results are set forth in Tables I–III.

The following example illustrates an endcapped imide grafted ethylene-propylene copolymer of the instant invention.

EXAMPLE 3

This example illustrates the preparation of a dodecenyl succinic anhydride endcapped imide grafted ethylene-propylene Copolymer.

A reactor vessel is charged with 722 grams of an imide grafted ethylene-propylene copolymer oil solution prepared substantially in accordance with the procedure of Example 1. The solution is heated to 150° C. under a nitrogen sparge. To this heated solution are added 4.69 grams (0.65 wt. %, 0.0176 mole) of dodecenyl succinic anhydride over a period of 5 minutes under a nitrogen blanket. Heating of this reaction mixture at 150° C. is continued for 0.5 hour under a nitrogen blanket. At the end of this period the oil solution of the reaction product is cooled to 100° C. and discharged from the reactor.

The kinematic viscosity of this reaction product oil solution is determined, at 100° C., initially and after storage for 6 weeks at 60° C., 80° C., and 100° C., respectively, and the results are set forth in Tables I–III.

TABLE I (Storage at 60° C.)

| Example No. | Initial Viscosity | Viscosity after 6 weeks | Δ Viscosity | Average Viscosity Increase %/hour |
|---|---|---|---|---|
| 1 | 968 | 1189 | +221 | +0.023 |
| 2 | 845 | 1103 | +258 | +0.030 |
| 3 | 893 | 949 | +56 | +0.0062 |

TABLE II (Storage at 80° C.)

| Example No. | Initial Viscosity | Viscosity after 6 weeks | Δ Viscosity | Average Viscosity Increase %/hour |
|---|---|---|---|---|
| 1 | 968 | 1376 | +408 | +0.042 |
| 2 | 845 | 1206 | +361 | +0.043 |
| 3 | 893 | 941 | +48 | +0.0053 |

TABLE III (Storage at 100° C.)

| Example No. | Initial Viscosity | Viscosity after 6 weeks | Δ Viscosity | Average Viscosity Increase %/hour |
|---|---|---|---|---|
| 1 | 968 | 1456 | +486 | +0.050 |
| 2 | 845 | 1433 | +588 | +0.069 |
| 3 | 893 | 1003 | +110 | +0.012 |

As illustrated by the data in Tables I–III the oil solution of dodecenyl succinic anhydride endcapped imide grafted ethylene copolymer of the instant invention (Example 3) exhibits improved viscosity stability upon storage than oil solutions of the non-endcapped imide grafted ethylene copolymer (Example 1) or the sulfonic acid endcapped imide grafted ethylene copolymer (Example 1).

What is claimed is:

1. A composition useful as an oil additive comprising reaction product of:
   (i) reaction product of
      (a) oil soluble ethylene copolymer comprising from about 15 to 90 wt. % ethylene and about 10 to 85 wt. % of at least one $C_3$ to $C_{28}$ alpha-olefin, said copolymer having a number average molecular weight within a range of about 10,000 to 500,000, grafted with ethylenically unsaturated carboxylic acid material having 1 to 2 carboxylic acid groups or anhydride group,
      (b) at least one polyamine selected from the group consisting of poly(alkylene amines) and poly(oxyalkylene amines) having at least two primary amine groups, and
      (c) at least one carboxylic acid material selected from long chain hydrocarbyl substituted succinic anhydride or acid having about 50 to 400 carbons in said hydrocarbyl; and
   (ii) a viscosity stabilizing effective amount of at least one $C_{12}$ to about $C_{16}$ aliphatic hydrocarbyl substituted succinic anhydride 2. The composition of claim 1 wherein said long chain hydrocarbyl substituted succinic anhydride or acid (i) (c) is polyisobutenyl succinic anhydride.

3. The composition of claim 1 wherein said (a) comprises a copolymer consisting essentially of about 30 to 80 wt. % ethylene and about 20 to 70 wt. % propylene and has a number average molecular weight in the range of about 10,000 to 250,000, grafted with maleic anhydride.

4. The composition of claim 1 wherein said hydrocarbyl of (ii) contains from 12 to 14 carbon atoms.

5. The composition of claim 4 wherein said hydrocarbyl of (ii) contains 12 carbon atoms.

6. An oil composition comprising a major proportion of oil selected from lubricating oil and fuel oil and about 0.01 to 50 wt. % of the oil soluble composition of claim 1.

7. An oil composition according to claim 6 which is a lubricating oil composition containing about 0.01 to 15 wt. % of said oil soluble composition.

8. An oil composition according to claim 6 which is an additive concentrate comprising a major amount of lubricating oil and about 5 to 50 wt. % of said oil soluble composition.

9. A process for improving the viscosity stability of an oil additive concentrate comprising a major proportion of oil selected from lubricating oil and fuel oil and from 5 to 50 wt. %, based on the total weight of said concentrate, of grafted ethylene copolymer comprising the reaction products of
   (a) oil soluble ethylene copolymer comprising from about 15 to 90 wt. % ethylene and about 10 to 85 wt. % of one or more $C_3$ to $C_{28}$ alpha-olefin, said copolymer having a number average molecular weight within a range of about 10,000 to 500,000, grafted with ethylenically unsaturated carboxylic acid material having 1 to 2 carboxylic acid groups or anhydride group,
   (b) at least one polyamine selected from the group consisting of poly(alkylene amines) and poly(oxyalkylene amines) having at least two primary amine groups, and
   (c) at least one carboxylic acid material selected from long chain hydrocarbyl substituted succinic anhydride or acid having about 50 to 400 carbons in said hydrocarbyl,
   said process comprising the step of reacting said concentrate with a viscosity stability improving effective amount of at least one $C_{12}$ to about $C_{16}$ aliphatic hydrocarbyl substituted succinic anhydride.

10. The process of claim 9 wherein said hydrocarbyl substituted succinic anhydride or acid (c) is polyisobutenyl succinic anhydride.

11. The process of claim 9 wherein said aliphatic hydrocarbyl substituted succinic anhydride is a $C_{12}$ to $C_{14}$ aliphatic hydrocarbyl substituted succinic anhydride.

12. The process of claim 11 wherein said hydrocarbyl substituted succinic anhydride is a $C_{12}$ hydrocarbyl substituted succinic anhydride.

13. The process of claim 9 wherein the amount of said $C_{12}$ to about $C_{16}$ hydrocarbyl substituted dicarboxylic acid anhydride is an excess of at least about 5% based on the unreacted primary amine concentration in said concentrate.

14. The process of claim 9 wherein a reaction mixture of said concentrate and said $C_{12}$ to about $C_{16}$ hydrocarbyl substituted dicarboxylic acid anhydride is maintained at a temperature of about 50° C. to 250° C. for a period of time from about 0.25 to 8 hours.

15. An oil soluble viscosity stabilized grafted ethylene copolymer useful as an oil additive prepared by a process comprising:

(i) forming a grafted ethylene-alpha-olefin copolymer by grafting (a) oil soluble ethylene copolymer comprising from about 15 to 90 wt. % ethylene and about 10 to 85 wt. % of at least one $C_3$ to $C_{28}$ alpha-olefin, said copolymer having a number average molecular weight of from about 10,000 to 500,000, with (b) ethylenically unsaturated carboxylic acid material having 1 to 2 carboxylic acid groups or anhydride group, (ii) admixing said grafted ethylene-alpha-olefin copolymer (i) with at least one carboxylic acid material selected from long chain hydrocarbyl substituted succinic anhydride or acid having about 50 to 400 carbons in said hydrocarbyl to form a reaction mixture, (iii) reacting the reaction mixture of (i) and (ii) with at least one polyamine selected from the group consisting of poly(alkylene amines) and poly(oxyalkylene amines) having at least two primary amine groups, and (iv) subsequently reacting said reaction product of (i) through (iii) with an amount of at least one $C_{12}$ to about $C_{16}$ aliphatic hydrocarbyl substituted succinic anhydride effective to improve the viscosity stability thereof.

16. The copolymer of claim 15 wherein said long chain hydrocarbyl substituted succinic anhydride or acid (ii) is polyisobutenyl succinic anhydride.

17. The copolymer of claim 15 wherein said aliphatic hydrocarbyl of (iv) is a $C_{12}$ to $C_{14}$ aliphatic hydrocarbyl.

18. The copolymer of claim 17 wherein said aliphatic hydrocarbyl of (iv) is a $C_{12}$ aliphatic hydrocarbyl.

* * * * *